United States Patent [19]

Chwalek et al.

[11] 4,171,384

[45] Oct. 16, 1979

[54] COMBINED DRY-WET MILLING PROCESS FOR REFINING WHEAT

[75] Inventors: Vincent P. Chwalek, Los Angeles, Calif.; Richard M. Olson, North Riverside, Ill.

[73] Assignee: CPC International Inc., Englewood Cliffs, N.J.

[21] Appl. No.: 904,953

[22] Filed: May 11, 1978

[51] Int. Cl.² .............................................. A23K 1/00
[52] U.S. Cl. ..................................... 426/623; 127/68; 426/630; 426/635
[58] Field of Search ............. 426/635, 507, 626, 288, 426/460, 463, 464, 481–484, 618, 627, 436, 518; 260/112 C; 127/67, 68, 23, 65

[56] References Cited

U.S. PATENT DOCUMENTS

| | | | |
|---|---|---|---|
| 2,455,981 | 12/1948 | Dimler | 127/67 |
| 3,788,861 | 1/1974 | Durst | 426/507 |
| 3,851,085 | 11/1974 | Rodgers et al. | 426/507 |
| 3,857,987 | 12/1974 | Rogols et al. | 260/112 G |
| 3,909,288 | 9/1975 | Powell et al. | 426/635 |
| 3,979,375 | 9/1976 | Rao et al. | 426/507 |
| 4,042,414 | 8/1977 | Goering et al. | 127/67 |
| 4,094,700 | 6/1978 | Rennes et al. | 127/65 X |
| 4,125,528 | 11/1978 | Rao et al. | 426/484 X |

*Primary Examiner*—R. B. Penland
*Attorney, Agent, or Firm*—Stanley M. Parmerter

[57] ABSTRACT

There is disclosed a continuous process for refining whole grain wheat to obtain a prime wheat starch fraction and an animal feed product, the process comprising dry milling wheat kernels to provide an endosperm fraction, a germ fraction, a fiber (bran) fraction and a cleanings fraction, wet milling the endosperm fraction to provide a mill starch slurry, removing fine fiber tailings from the mill starch slurry, separating the slurry into a starch-rich and protein-rich fraction, concentrating the protein-rich fraction, directly combining the fiber (bran), cleanings, fine fiber tailings and protein-rich concentrate, and the germ fraction to provide a wet animal feed product, and drying the feed product.

12 Claims, 4 Drawing Figures

COMBINED DRY-WET MILLING PROCESS FOR REFINING WHEAT

BACKGROUND OF THE INVENTION

This invention relates to a process for the refining of wheat based on the combined use of dry milling and wet milling procedures, and using a unique wet milling sequence, to obtain high quality wheat starch and an animal feed.

A wheat kernel consists of three major components: (i) a fibrous outer layer or wheat bran, (ii) germ, and (iii) endosperm. The endosperm contains two important ingredients, wheat starch and wheat gluten. Wheat starch has a wide variety of applications, including its use as a constituent in adhesives and in paper making, as a food thickener, and as a source of dextrose sugar and other food sweeteners. Wheat gluten, in its naturally occurring "vital" form, can be admixed with water to form a cohesive, pliable mass which is useful in the preparation of bakery goods.

A variety of methods for refining whole wheat are known. In the more conventional processes, which are based on the use of dry milling techniques, the bran and germ are separated from the endosperm while in the dry state, and the endosperm is dry ground into fine particles, i.e., wheat flour. The wheat flour is then refined further to obtain wheat starch and wheat gluten. Commercially, the separation of starch and wheat gluten from flour is commonly effected by forming the flour into a dough or batter, mechanically consolidating the gluten into solid masses and washing away the starch. Typically, the germ and bran are discarded as undesirable by-products.

More recently, wheat refining processes based on the use of wet milling techniques have been proposed. In general, whole wheat kernels are soaked in water to soften, or "temper" the wheat kernel, the soaked kernel is milled to split the outer layer and to remove at least the bran, and the resulting endosperm or endosperm and germ is treated further to obtain a baking dough or separated into a starch fraction and a protein (gluten) fraction. See, e.g., Rodgers et al U.S. Pat. No. 3,851,085, Galle et al, U.S. Pat. No. 3,958,016, Durst, U.S. Pat. No. 3,788,861 and Rao et al, U.S. Pat. Nos. 3,790,553, 3,979,375 and 3,891,613.

In German Offenlegungsschrift No. 2,642,628, there is disclosed a process in which wheat is dry milled to separate endosperm fractions from the kernel, the endosperm is dispersed in water, and the aqueous dispersion is separated by centrifuging into a starch-rich fraction and a gluten-rich fraction.

OBJECTS OF THE INVENTION

It is an object of this invention to provide a combined dry-wet wheat refining process which makes efficient use of all of the major constituents of whole wheat in the formation of end products.

It is a further object of this invention to provide a new wet milling procedure for wheat endosperm which facilitates the separation of wheat starch in high yield.

It is another object of this invention to provide a unique wet milling sequence which enables the use of relatively short steeping times.

These objects are realized by the wheat refining process described below.

DESCRIPTION OF THE INVENTION

According to this invention in its broadest aspects, there is provided a wheat refining process, comprising:
(A) dry milling whole grain wheat to provide
 (a) an endosperm fraction,
 (b) a germ fraction,
 (c) a fiber (bran) fraction, and
 (d) a cleanings fraction;
(B) wet milling the single endosperm fraction of (A)(a) by sequentially
 (i) steeping the endosperm fraction,
 (ii) separating the larger wet endosperm particles from the smaller wet endosperm particles,
 (iii) milling the larger wet endosperm particles to reduce their particle size,
 (iv) recombining the smaller wet endosperm particles of (ii) and (iii) into a single fraction, and
 (v) steeping the endosperm fraction again to provide a mill starch slurry;
(C) separating fine fiber tailings from the mill starch slurry of (B)(v);
(D) separating the defibered mill starch slurry of (C) into a starch-rich fraction and a protein-rich fraction;
(E) concentrating the protein-rich fraction of (D);
(F) directly combining each of the fiber (bran) fraction, the cleanings fraction and the germ fraction of (A), the fine fiber tailings fraction of (C) and the protein-rich concentrate of (E) to provide a wet animal feed product; and
(G) drying the wet feed product of (F) to obtain a final animal feed product.

The term "dry milling" is used herein to mean milling the whole wheat kernel in substantially the dry state, without presoaking the grain, to separate the kernel into its major constituents, e.g., fiber (bran), germ and endosperm, as well as wheat cleanings in minor proportions.

By way of illustration, the process of this invention is carried out as follows:

Dry whole wheat kernels are first cleaned to remove chaff and other external vegetable matter. The cleanings are used in the preparation of the animal feed product. The cleaned wheat kernels are then mechanically treated to separate an endosperm fraction, a fiber (bran) fraction and a germ fraction. The means used for separation are not critical, and conventional techniques can be employed. As an example, mention is made of the dry milling procedures disclosed in German Offenlegungsschrift No. 2,642,628, which is incorporated herein by reference to save unnecessary detail. In this procedure, wheat kernels are passed through a mill subdivided into several groups of passes, each of which includes at least one pair of rollers and a sifting installation such as a plansifter, and the wheat endosperm is separated from the wheat germ and fiber (bran).

The endosperm fraction from the dry milling step is then subjected to a wet milling procedure. In this procedure, the particles of the endosperm fraction are first steeped, then the larger soaked particles are separated from the smaller soaked endosperm particles, selectively milled while still in the wet state to reduce their particle size and recombined with the smaller, unmilled endosperm particles. The combined particles are then subjected to a second steeping step. The residence time of the particles in each of the two steeping steps can vary. In general, however, the total residence time of the endosperm particles in the two steeping steps combined is preferably in the range of from about 2 to about 6 hours.

Preferably, the first steeping step is conducted for a period of about one-half hour. The steeping medium in which the endosperm particles are soaked comprises an aqueous solution of an acid, e.g., sulfurous, or a base, e.g., sodium hydroxide. If sulfurous acid is used, an initial concentration of from about 2,000 to about 4,000 ppm of $SO_2$ in water is preferred. If an aqueous solution of sodium hydroxide is used, the solution is preferably adjusted to an initial pH of from about 10 to about 11.5. It is to be understood that as the endosperm particles remain in the steeping medium, the sulfur dioxide concentration or pH may undergo change. Accordingly, additional amounts of acid or base may be added to adjust the steeping medium to the desired value during either of the two steeping steps. After the first steeping step is completed, the endosperm particles preferably possess a water content of from about 25 to about 35% by weight, wet solids basis.

The steeped endosperm particles are then passed through a sieve or screen of suitable pore size such that the larger particles, e.g., more than about 50–75 microns in diameter, are retained on the screen and the smaller particles, e.g., about 50–75 microns or less, pass through together with most of the process (steep) water. The larger particles are collected and milled while wet, preferably with an impact mill, to reduce their particle size to about that of the smaller particles, e.g., 50–75 microns or less.

The milled particles are recombined with the smaller particles and process water, which have been bypassed around the mill, and the composite is next subjected to the second steeping step. It is advantageous to employ elevated temperatures, e.g., about 90° to 130° F., for both steeping steps and to maintain the endosperm particles in suspension in the process water by suitable means, such as by agitation or recirculation of the process water. This completes the wet milling portion of the process. A mill starch slurry of endosperm particles in process (steep) water, normally having a specific gravity of from about 7° to about 9° Baumé, is thus obtained.

The mill starch slurry from the wet milling step is then treated to separate and recover any fine bran fibers which may still remain. This is done conveniently by passing the slurry through a sieve or screening device having a pore size of about 37 to 53 microns. The clean-up tailings which are retained on the screen, comprising a wet mixture of predominantly fine wheat fiber and a minor proportion of endosperm agglomerates, are used as a component in the animal feed product.

The filtrate from the sieve, still in the form of a mill starch slurry, is then treated to separate and recover wheat starch. To this end, any conventional means can be employed. Suitable separation systems include an all-DorrClone system, such as disclosed in copending application Ser. No. 734,683, filed Oct. 22, 1976, now U.S. Pat. No. 4,144,087; systems comprising centrifuges for starch separation and hydroclones for starch washing; and systems comprising centrifuges for both starch separation and washing. Preferably, the separation system comprises two or more hydroclones connected in a multi-stage countercurrent arrangement, e.g., the aforementioned all-Dorr Clone system.

The hydroclone, or liquid cyclone, is a cone-shaped tubular device into which the mill starch slurry is forced under pressure. The size of the tangential inlet orifice is selected to produce a rotational velocity of the feed material sufficient to result in a separation of the particles according to differences in particle size and settling rates. Thus, a heavier, starch-rich fraction, comprised primarily of "A" starch, is collected as an underflow stream, and a lighter, protein-rich fraction, comprised predominantly of non-vital wheat gluten and a minor amount of "B" starch, is collected as an overflow stream. The starch-rich fraction can be dried to yield a prime, high quality wheat starch product.

The terms "A starch" and "B starch" are recognized in the art to roughly distinguish between two types of wheat starch granules which differ according to particle size and settling rate. "B" starch has virtually the same settling rate as wheat gluten and is thus not readily separated from the latter using conventional equipment. "A" starch, on the other hand, differs sufficiently from wheat gluten in settling rate such that these two constituents can be separated without the need for special equipment or separation techniques.

The protein-rich fraction is collected, concentrated, preferably in a centrifuge, and then combined with the dry milled bran fiber fraction, cleanings fraction and germ fraction and, in addition, the wet fine fiber clean-up tailings, to form a wet animal feed product. The wet feed product is ultimately dried in a heated enclosure to produce the final feed product.

DESCRIPTION OF THE SPECIFIC EMBODIMENTS

The process of this invention is further illustrated by the following detailed description, with reference to the accompanying drawings.

Figure 1:
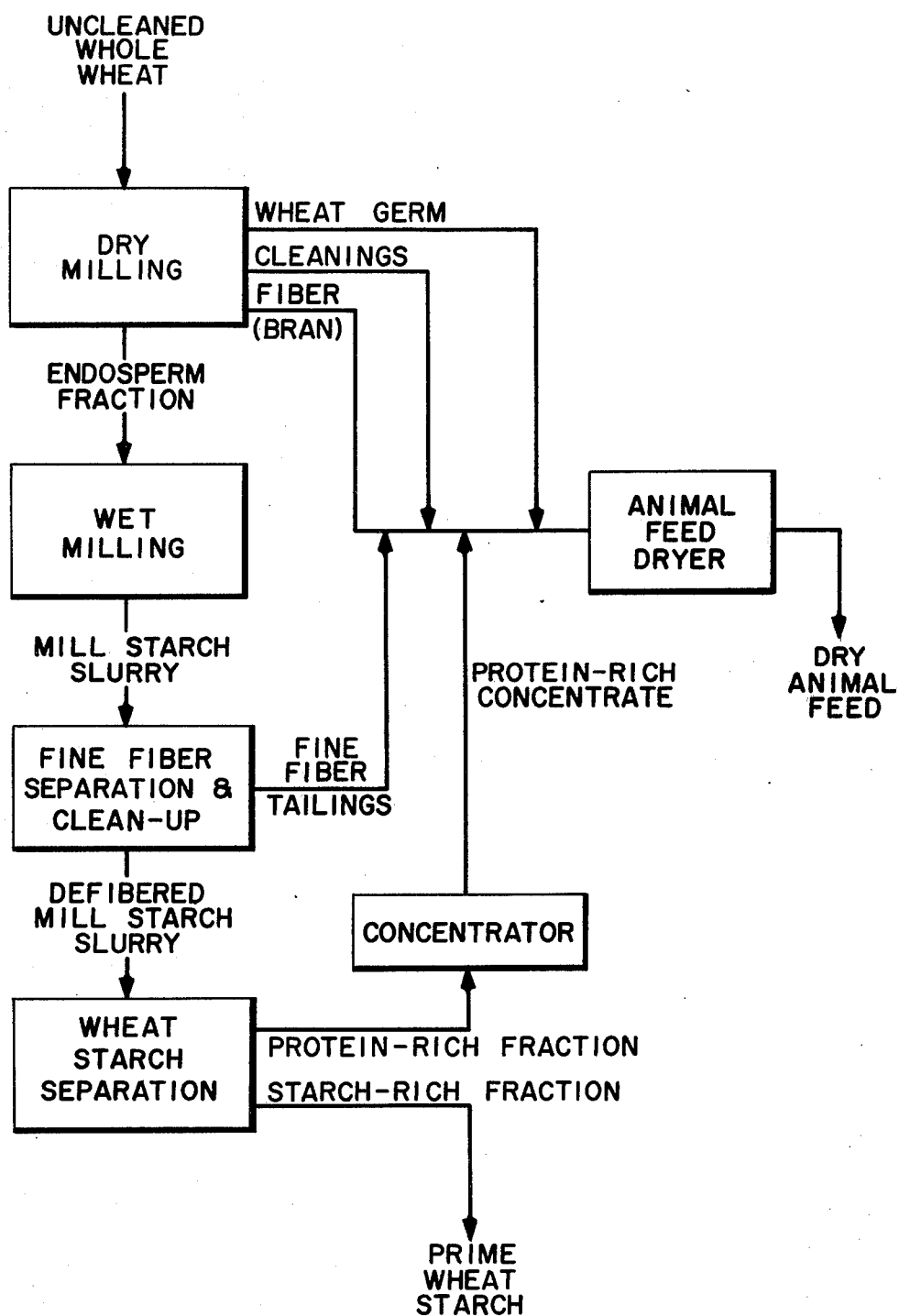
FIG. 1 is a schematic block diagram showing a complete process according to this invention.

With reference to FIG. 1, dry, uncleaned whole wheat is conveyed to a dry milling station where it is screened to remove large and small pieces of chaff and other admixed vegetable matter, and is further processed to separate the fiber (bran) and wheat germ from the endosperm. The dry milled endosperm is wet milled to form a mill starch slurry, from which fine wheat fiber tailings are then separated, and the defibered mill starch slurry is thereafter treated to provide a protein-rich fraction and a separate starch-rich ("A" starch) fraction. The protein-rich fraction, containing wheat gluten and "B" starch, is then concentrated. The cleanings, fiber (bran) and wheat germ from the dry milling step, the wet fine fiber tailings and the wet protein-rich concentrate are all combined and dried to form a final animal feed product.

Figure 2:
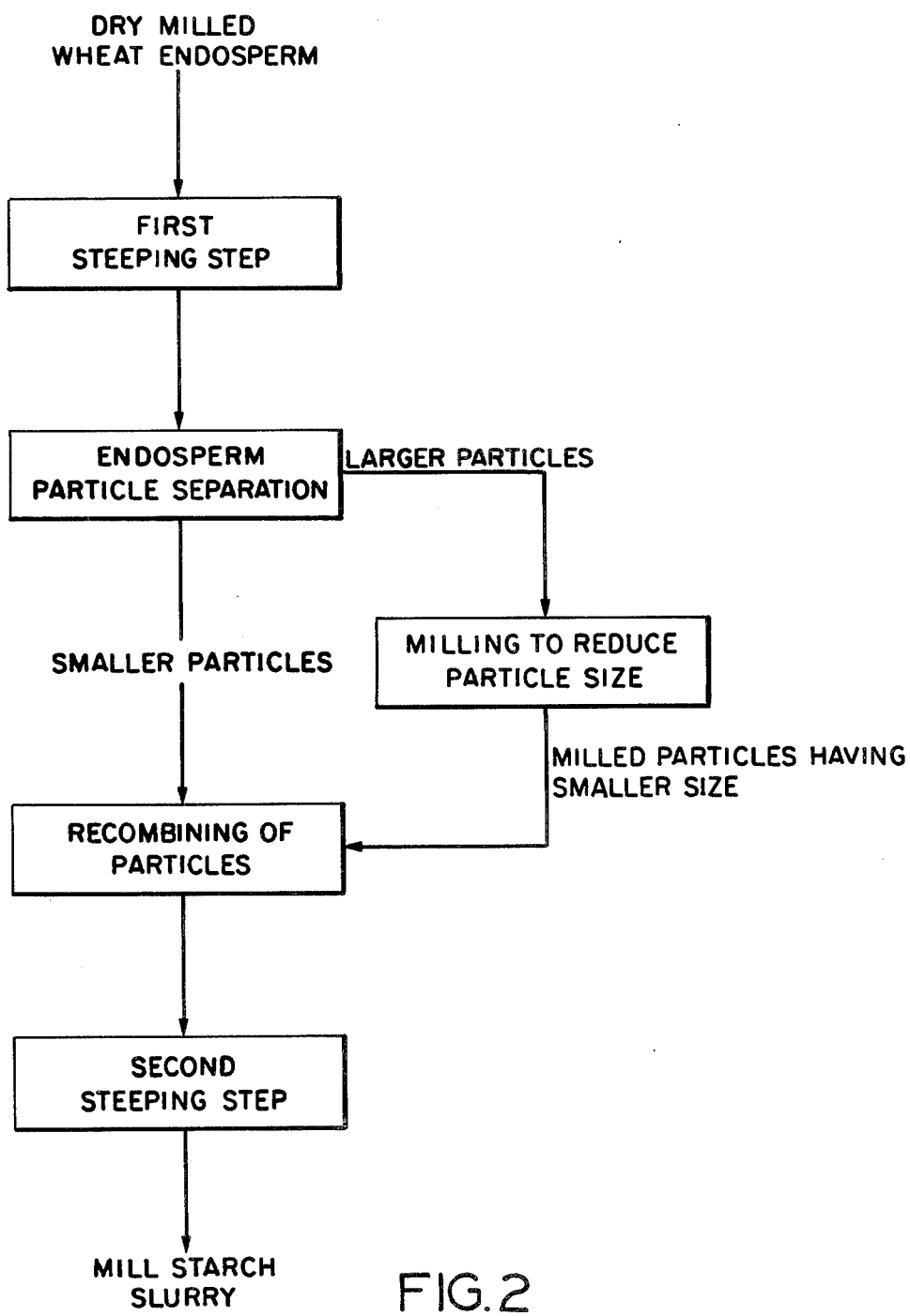
FIG. 2 is a schematic block diagram of a preferred procedure for carrying out the wet milling step of the process.

With reference to FIG. 2, in the wet milling step the endosperm fraction from the dry milling step is, in sequence, steeped, the larger soaked endosperm particles are separated and milled while still wet to reduce the particle size, the milled endosperm particles are combined with the unmilled endosperm particles, and the combined endosperm fraction is steeped again to form a mill starch slurry.

Because of the small size of the wheat germ, a clean separation of the germ from the endosperm is not always possible. Consequently, the endosperm fraction may include some wheat germ, in minor proportions. This presents no difficulty, however, since the presence of wheat germ will not interfere with the subsequent wet processing of the endosperm fraction.

Figure 3:
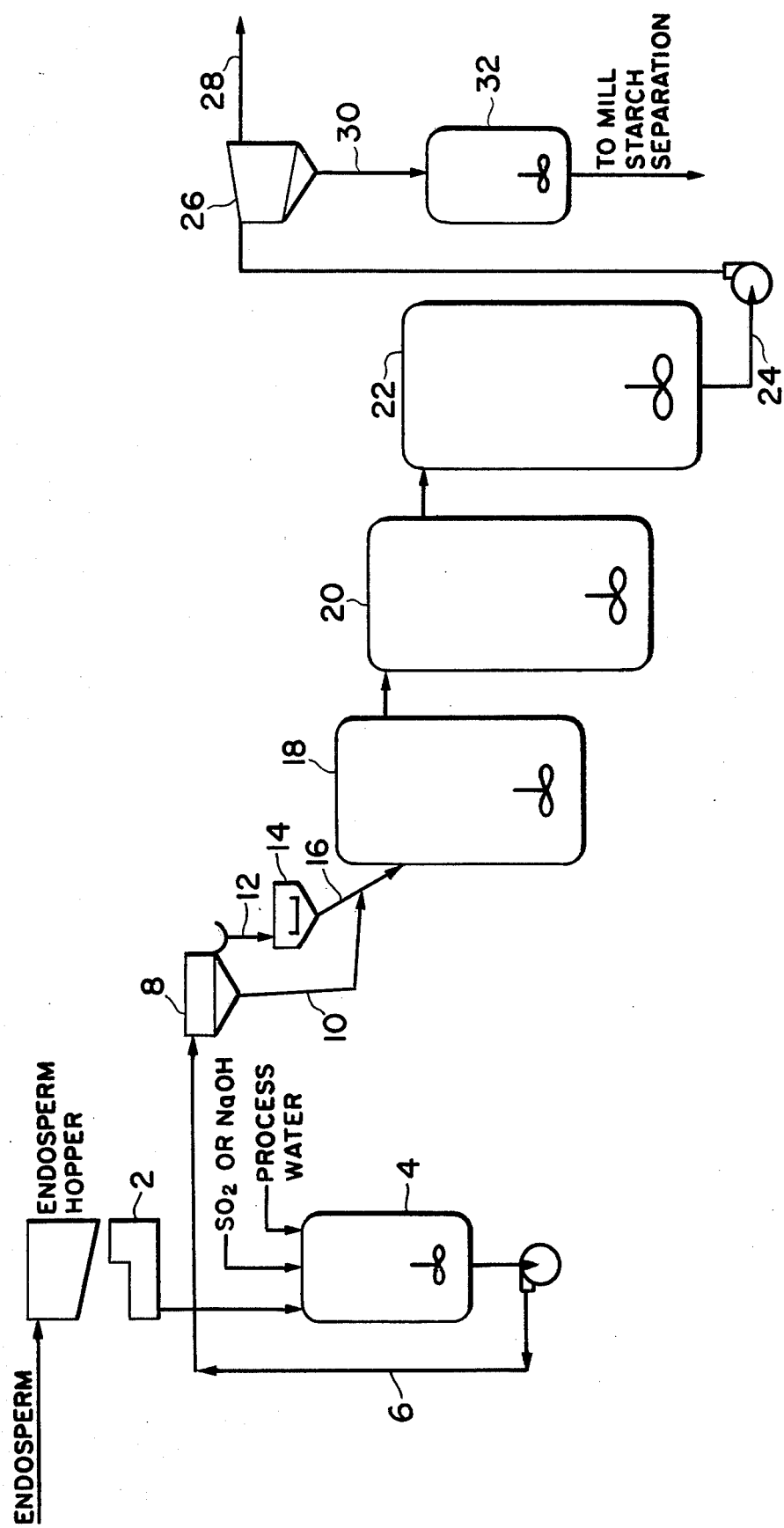
FIG. 3 is a flow diagram showing, in detail, the wet milling and fine fiber separating steps of the process.

With reference to FIG. 3, the endosperm fraction from the dry milling step is measured from scale meter 2, into steep tank 4, where the dry endosperm particles are mixed with water and an acid, e.g., sulfur dioxide gas, or caustic, e.g., sodium hydroxide. Preferably, a weight ratio of process water to endosperm solids in the range of from about 5:1 to about 6:1 is used. An amount of sulfur dioxide, or sodium hydroxide, sufficient to provide an initial sulfur dioxide concentration of from about 2,000 to about 4,000 parts per million (ppm), based on the water phase, or in the case of sodium hydroxide, an initial pH of from about 10 to about 11.5, is added. During this first steeping step, the process water is preferably maintained at an elevated temperature above room temperature, e.g., from about 90° to about 130° F., especially preferably about 115° F. Vigorous agitation is applied to keep the insoluble wheat solids in suspension during steeping. In general, about one-half hour of steeping time is sufficient, but slightly longer retention times can be used, e.g., about 1-2 hours.

After the first steeping step is completed, the soaked endosperm particles are pumped from steep tank 4, through centrifugal paddle screen 8, e.g., Indiana Canning Machine Co., Model No. 77, or equivalent, preferably having a pore size of about 50 to 75 microns. Filtrate stream 10, comprising process water and undersize particles, i.e., about 50-75 microns or less, passes through while oversize particles 12, i.e., greater than about 50-75 microns, are retained on the screen. Oversize particles 12, collected from screen 8, are milled in impact mill 14, e.g., a 40-inch Entoleter impact mill, preferably operated at speeds of about 3100 revolutions per minute (rpm), to reduce their particle size to no greater than about 50-75 microns.

Filtrate stream 10, which bypasses around impact mill 14 along with the major portion of the process water, and impact mill discharge stream 16, are both combined and sent to steep tanks 18, 20 and 22 for the second steeping step of the wet milling procedure. Steep tanks 18, 20 and 22 are preferably equipped with agitators and connected in series by overflow. The endosperm particles are maintained in suspension in the process water, in the steep tank, using agitation, for a period of about 4 hours. As in the case of the first steeping step, the temperature is maintained in the range from about 90° to about 130° C. This can be done conveniently by recirculating the process water through heat exchangers. If necessary, suitable amounts of sulfur dioxide, or sodium hydroxide, can be added to adjust the $SO_2$ concentration or pH to the desired value.

After the second steeping step is completed, the endosperm fraction, in the form of a mill starch slurry of endosperm particles and process water, 24, is removed from the steep tanks and passed through fine fiber separating and clean-up screen 26, for the removal of fine bran fiber tailings. A screen pore size of from about 37 to about 53 microns is preferred. Wet fine fiber clean-up tailings 28, are collected for inclusion in the animal feed product. The remaining endosperm particles, still in the form of a mill starch slurry, 30, pass through screen 26 and are collected in mill starch hold tank 32.

Figure 4:
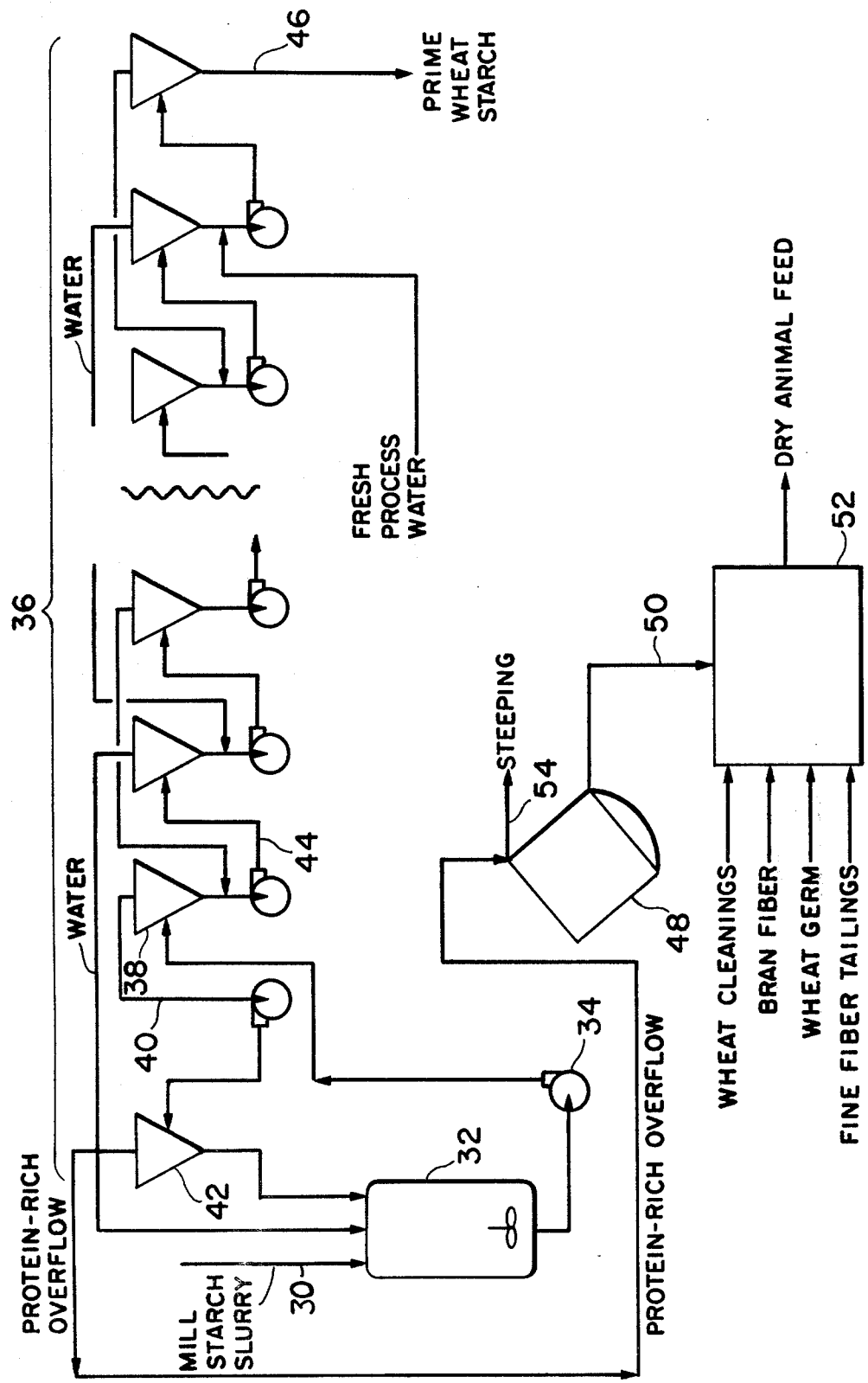
FIG. 4 is a flow diagram showing, in detail, the wheat starch separating, protein fraction concentrating and animal feed production step.

With reference to FIG. 4, the mill starch slurry from mill starch tank 32, having a specific gravity of from about 7° to about 9° Baumé, is pumped through pump 34 into hydroclone separating system 36. Hydroclone system 36 preferably comprises a plurality, e.g., from about 10 to about 14, stages of 10-millimeter internal diameter DorrClone units, manufactured by the Dorr-Oliver Co. The mill starch slurry is first directed through hydroclone stage 38. Overflow 40, from hydroclone stage 38, which comprises a protein-rich stream containing a major proportion of non-vital wheat gluten and a minor proportion of "B" starch, is pumped through hydroclone unit 42. The overflow from hydroclone unit 42, comprising a still further protein-enriched stream, is collected for concentrating.

Underflow 44 from hydroclone stage 38, comprising an "A" starch-enriched stream is directed through the remainder of the hydroclone units in hydroclone system 36, in turn, whereby an increasingly "A" starch-enriched underflow is obtained from each further unit in succession. Ultimately, starch-rich fraction 46, comprising prime "A" wheat starch, is collected. Fresh process water, which is fed countercurrently back through hydroclone system 36, represents the only fresh water input to the entire process.

With further reference to FIG. 4, the protein-rich overflow from hydroclone unit 42, is sent to concentrating station 48, comprising a MERCO BH-30 centrifuge, or equivalent. Underflow 50, comprising a wet protein-rich concentrate, is sent to animal feed dryer 52, where it is combined with the wheat cleanings, fiber (bran), germ and fine fiber tailings fractions previously collected during the process. Overflow 54, comprising used process water containing a minor amount of wheat insolubles, is recycled back to the process for further use in steeping.

The end products of the process as just described, are a prime wheat starch fraction and a high protein animal feed product.

Because the process is continuous instead of batchwise, inventories within the system are low and the entire operation can be quickly started or stopped at any point.

The process of this invention is further illustrated in the following examples.

EXAMPLE 1

One-hundred and two pounds of uncleaned dry wheat kernels, containing from about 12 to about 14% by weight of innate moisture, are passed through a sieve having a pore size of about ¼ inch round holes, and over a 12 mesh wire screen, and substantially all of the chaff and other vegetable matter in external admixture with the kernels are separated. The cleaned wheat kernels are then dry milled to provide an endosperm fraction, a wheat germ fraction and a fiber (bran) fraction.

A total of 18 pounds of fiber (bran) and wheat germ, combined, and 82 pounds of endosperm are thus obtained. The endosperm fraction has the following composition:

| DRY SUBSTANCE | PERCENT BY WEIGHT |
| --- | --- |
| Starch | 79 |
| Protein | 11 |
| Fat | 0.4 |

-continued

| DRY SUBSTANCE | PERCENT BY WEIGHT |
| --- | --- |
| Fiber (Bran) | 0.5 |
| Other | 9.1 |
| | 100 TOTAL |

The dry milled endosperm fraction is immersed in a tank of aqueous sulfurous acid, having a concentration of about 2,000 ppm of sulfur dioxide, at a temperature of about 115° F., with vigorous agitation for a period of one-half hour. A ratio of sulfurous acid to endosperm solids of about 0.017:1, by weight, is used. After one-half hour, the soaked wheat kernels and process water are pumped from the tank through a screen, Model No. 77, Indiana Canning Machine Co., having a pore size of about 50 microns. The larger endosperm particles, greater than about 50 microns, are retained on the screen. The retained particles are collected and milled on an Entoleter impact mill, having an internal diameter of about 40 inches, operated at a speed of 3100 rpm, and the particle size of the endosperm particles is thus reduced to about 50 microns or less. The milled particles are recombined with the filtrate from the screen, which comprises sub-50-micron particles and process water bypassed around the mill. The recombined endosperm fraction and process water are placed in a second steep tank, where the mixture is maintained at a temperature of about 115° F., for about four hours, using vigorous agitation.

A suspension of insoluble wheat endosperm particles, comprising a mill starch slurry having a specific gravity of 8° Baumé, is recovered from the second steep tank and passed through a Starcossa centrifugal screen, equipped with a cloth having a pore size of about 53 microns. Fine wheat fiber tailings and a minor proportion of endosperm agglomerates are retained on the sieve and collected, while the remainder of the slurry passes through. The portion of the mill starch slurry which has passed through the centrifuge screen is directed through a series of 11 DorrClone hydroclone units, 10-mm internal diameter, available from Dorr-Oliver Co., and connected in countercurrent arrangement. A protein-rich overflow stream, which contains non-vital wheat gluten and "B" starch, and a starch-rich underflow stream, which contains prime "A" starch, are taken off from the hydroclone system. The protein-rich stream is concentrated in a MERCO BH-30 centrifuge and a protein-rich concentrate is obtained.

The protein-rich concentrate from the BH-30 centrifuge, still in the wet state, is combined with the dry milled wheat cleanings fraction, the dry milled wheat germ fraction, the dry milled fiber (bran) fraction and the wet fine fiber clean-up tailings collected from the Starcossa centrifugal screen, to form a wet animal feed product. The wet feed product is dried in an oven at 250° F. for about 4 hours, forming a final animal feed product.

A yield of 53 pounds of prime "A" wheat starch, or 52% by weight, and 49 pounds of animal feed, or 48% by weight is obtained.

Other modifications and variations of the process of this invention will suggest themselves from the above description. It is to be understood, therefore, that changes may be made in the embodiments shown without departing from the scope of the invention as defined in the appended claims.

We claim:

1. A continuous wheat refining process, which comprises:
   (A) dry milling whole grain wheat to provide
      (a) an endosperm fraction,
      (b) a germ fraction,
      (c) a fiber (bran) fraction, and
      (d) a cleanings fraction;
   (B) wet milling the single endosperm fraction of (A)(a) by sequentially
      (i) steeping the endosperm fraction,
      (ii) separating the larger wet endosperm particles from the smaller wet endosperm particles,
      (iii) milling the larger wet endosperm particles to reduce their particle size,
      (iv) recombining the wet endosperm particles of (ii) and (iii) into a single fraction, and
      (v) steeping the endosperm fraction again to provide a mill starch slurry;
   (C) separating fine fiber tailings from the mill starch slurry of (B)(v);
   (D) separating the defibered mill starch slurry of (C) into a starch-rich fraction and a protein-rich fraction;
   (E) concentrating the protein-rich fraction of (D);
   (F) directly combining each of the fiber (bran) fraction, the cleanings fraction and the germ fraction of (A), the fine fiber tailings fraction of (C) and the protein-rich concentrate of (E) to provide a wet animal feed product; and
   (G) drying the wet feed product of (F) to obtain a final animal feed product.

2. The process of claim 1 wherein in wet milling step (B), the initial weight ratio of the process (steep) water to the endosperm particles is in the range of from about 5:1 to about 6:1.

3. The process of claim 1 wherein the first steeping step (B)(i) and the second steeping step (B)(v) are conducted in an aqueous medium at an acid or alkaline pH.

4. The process of claim 3 wherein the steeping medium is acidic.

5. The process of claim 4 wherein the steeping medium comprises a solution of sulfur dioxide in water.

6. The process of claim 3 wherein the steeping medium is alkaline.

7. The process of claim 6 wherein the steeping medium comprises a solution of sodium hydroxide in water.

8. The process of claim 1 wherein the total residence time of the endosperm particles in steeping steps (B)(i) and (B)(v) is in the range of from about 2 to about 6 hours.

9. The process of claim 1 wherein in milling step (B)(iii) endosperm particles having a size of greater than about 50 to about 75 microns are reduced in size to about 50 to about 75 microns or less.

10. The process of claim 1 wherein step (D) is conducted by passing the mill starch slurry through a plurality of hydroclones.

11. The process of claim 10 wherein the mill starch slurry has a specific gravity of from about 7° to about 9° Baumé.

12. A continuous wheat refining process, which comprises:
   (A) dry milling whole grain wheat to provide
      (a) an endosperm fraction,
      (b) a germ fraction,
      (c) a fiber (bran) fraction, and
      (d) a cleanings fraction;

(B) wet milling the single endosperm fraction of (A)(a) by sequentially
  (i) steeping the endosperm fraction in a solution of sulfur dioxide in water, the initial weight ratio of the process (steep) water to the endosperm particles being in the range of from about 5:1 to about 6:1,
  (ii) separating the wet endosperm particles having a size of greater than about 50 microns from the smaller wet endosperm particles,
  (iii) impact milling the wet endosperm particles having a size of greater than about 50 microns to reduce their particle size to about 50 microns or less,
  (iv) recombining the wet endosperm particles of (ii) and (iii) into a single fraction, and
  (v) steeping the endosperm fraction again in a solution of sulfur dioxide in water to provide a mill starch slurry, the total residence time of steeping steps (i) and (v) combined being in the range from about 2 to about 6 hours;
(C) separating fine fiber tailings from the mill starch slurry of (B)(v);
(D) passing the defibered mill starch slurry of (C), having a specific gravity of from about 7° to about 9° Baumé, through a plurality of hydroclones to provide an underflow stream comprising a starch-rich fraction and an overflow stream comprising a protein-rich fraction;
(E) concentrating the protein-rich fraction of (D);
(F) directly combining each of the fiber (bran) fraction, the cleanings fraction and the germ fraction of (A), the fine fiber tailings fraction of (C) and the protein-rich concentrate of (E) to provide a wet animal feed product; and
(G) drying the wet feed product of (F) to obtain a final feed product.

* * * * *